(12) United States Patent
Yoshida et al.

(10) Patent No.: US 9,289,963 B2
(45) Date of Patent: Mar. 22, 2016

(54) SILICONE ELASTOMER COMPOSITION

(75) Inventors: Hiroaki Yoshida, Ichihara (JP); Nozomi Ishigami, Ichihara (JP)

(73) Assignee: DOW CORNING TORAY CO., LTD., Chiyoda-Ku, Tokyo (JP)

( * ) Notice: Subject to any disclaimer, the term of this patent is extended or adjusted under 35 U.S.C. 154(b) by 191 days.

(21) Appl. No.: 13/518,357

(22) PCT Filed: Dec. 22, 2010

(86) PCT No.: PCT/JP2010/073859
§ 371 (c)(1),
(2), (4) Date: Jun. 21, 2012

(87) PCT Pub. No.: WO2011/078405
PCT Pub. Date: Jun. 30, 2011

(65) Prior Publication Data
US 2012/0263959 A1 Oct. 18, 2012

(30) Foreign Application Priority Data
Dec. 24, 2009 (JP) .................................. 2009-293392

(51) Int. Cl.
*B32B 25/20* (2006.01)
*C09D 183/04* (2006.01)
*B32B 7/12* (2006.01)
*C08L 83/04* (2006.01)
*C08G 77/12* (2006.01)
*C08G 77/20* (2006.01)
*C08K 5/3467* (2006.01)
*C08K 5/56* (2006.01)

(52) U.S. Cl.
CPC . *B32B 7/12* (2013.01); *B32B 25/20* (2013.01); *C08L 83/04* (2013.01); *C09D 183/04* (2013.01); *C08G 77/12* (2013.01); *C08G 77/20* (2013.01); *C08K 5/3467* (2013.01); *C08K 5/56* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 4,513,061 | A * | 4/1985 | Kawakubo et al. | 428/429 |
| 5,153,244 | A * | 10/1992 | Akitomo et al. | 524/88 |
| 2001/0018473 | A1 | 8/2001 | Otomo et al. | |
| 2002/0188059 | A1 | 12/2002 | Otomo | |
| 2007/0009748 | A1 * | 1/2007 | Takanami et al. | 428/447 |
| 2007/0129492 | A1 * | 6/2007 | Colborn et al. | 525/100 |
| 2007/0232750 | A1 * | 10/2007 | Iwata et al. | 524/588 |
| 2008/0221232 | A1 * | 9/2008 | Ou et al. | 521/154 |

FOREIGN PATENT DOCUMENTS

| | | | | |
|---|---|---|---|---|
| EP | 0426137 | A1 | 5/1991 | |
| JP | 53042808 | A * | 4/1978 | ............... G03C 1/68 |
| JP | 03-146560 | A | 6/1991 | |
| JP | 07-196918 | A | 8/1995 | |
| JP | 2001-214101 | A | 8/2001 | |
| JP | 2005-325158 | A | 11/2005 | |
| JP | 2008-224775 | A | 9/2008 | |
| JP | 2009-263552 | A | 11/2009 | |

OTHER PUBLICATIONS

English Abstract of JP 53042808 (1978).*
English language abstract for JP 03-146560 extracted from the PAJ database on May 30, 2012, 5 pages.
English language abstract and translation for JP 07-196918 extracted from the PAJ database on Aug. 21, 2012, 20 pages.
International Search Report for Application No. PCT/JP2010/073859 dated Feb. 23, 2011, 3 pages.
English language abstract and machine-assisted English translation for JP 2009-263552 extracted from the PAJ database on Jul. 22, 2013, 50 pages.
English language abstract and machine-assisted English translation for JP 2005-325158 extracted from the PAJ database on Jan. 3, 2014, 33 pages.
English language abstract for JP 2001-214101 extracted from the espacenet.com database on Jan. 3, 2014, 6 pages.
English language abstract and machine-assisted English translation for JP 2008-224775 extracted from the PAJ database on Jan. 3, 2014, 43 pages.

* cited by examiner

*Primary Examiner* — Kenneth Stachel
(74) *Attorney, Agent, or Firm* — Howard & Howard Attorneys PLLC

(57) ABSTRACT

The present invention has an objective to provide a silicone elastomer composition in which a cured product thereof is flexible, which provides a silicone elastomer with a small hardness change even due to thermal aging, and in which superior adhesive properties with respect to other silicone elastomers and superior curing properties are exhibited. The objective of the present invention can be achieved by a silicone elastomer composition comprising: (A) an organopolysiloxane having two or more silicon atom-bonded alkenyl groups on average in a molecule, in which the content of the alkenyl group is less than 0.2% by weight with respect to the amount of component (A); (B) an organopolysiloxane having two or more silicon atom-bonded hydrogen atoms on average in a molecule, in which the amount of the silicon atom-bonded hydrogen atoms in component (B) ranges from 2.5 to 10 mol with respect to one mol of the silicon atom-bonded alkenyl group in component (A); (C) a platinum-group metal-based catalyst, in a specified amount; and (D) a phthalocyanine compound, in which the amount thereof ranges from 5 to 50 mol with respect to one mol of the platinum-based metal in component (C).

11 Claims, No Drawings

SILICONE ELASTOMER COMPOSITION

TECHNICAL FIELD

The present invention relates to a silicone elastomer composition which forms an adhesive silicone elastomer by means of curing. In addition, the present invention relates to a silicone elastomer laminate obtained by using the aforementioned silicone elastomer composition.

This application claims priority to and all the advantages of International Patent Application No. PCT/JP2010/073859, filed on Dec. 22, 2010, which claims priority to Japanese Patent Application No. JP 2009-293392, filed on Dec. 24, 2009.

BACKGROUND ART

Conventionally, silicone elastomers have been used in order to impart thermal conductivity, stress relaxation properties and the like, as well as, insulation properties, semiconductivity or conductivity depending on usages, to electronic components installing heater elements, electronic components installed in vehicles which are exposed to high temperatures and the like. However, silicone elastomers, and in particular, addition reaction-curable silicone elastomers utilizing hydrosilylation reactions exhibit poor adhesive properties with respect to substrates and other silicone elastomers; and in the case of forming hybrid products or silicone elastomer laminates therefrom, primer treatments of the substrates, use of silicone-based adhesives and the like must be carried out.

However, an adhesion layer obtained by curing a conventional silicone-based adhesive possesses a high degree of hardness. For this reason, there are problems in that it is difficult to obtain a flexible silicone elastomer laminate, and in particular, the hardness of the adhesion layer further increases due to thermal aging, and thereby, flexibility is further impaired. Therefore, the adhesion layer must be made thinner to, for example, 100 μm or less, and it has been difficult to exhibit a function as an elastic layer.

In addition, after conventional silicone-based adhesives are once cured to form adhesion layers, the silicone-based adhesives do not possess adhesive properties anymore with respect to a silicone elastomer which is newly provided on the aforementioned adhesion layer.

Japanese Unexamined Patent Application, First Publication No. H03-146560 describes a curable organopolysiloxane composition comprising an organopolysiloxane containing alkenyl groups, an organopolysiloxane containing silicon-bonded hydrogen atoms, a platinum-based catalyst and a phthalocyanine compound, and also describes that an organopolysiloxane rubber obtained by curing the aforementioned composition possesses reduced permanent compression deformation. However, the aforementioned patent literature fails to describe or suggest adhesive properties with respect to silicone elastomers.

Japanese Unexamined Patent Application, First Publication No. H07-196918 describes a silicone rubber composition comprising a polyorganosiloxane having a specified degree of polymerization, an agent for imparting conductivity, a phthalocyanine compound and an organic peroxide, but fails to describe or suggest an addition reaction-curable silicone elastomer composition utilizing a hydrosilylation reaction and adhesive properties thereof with respect to the silicone elastomers.

DISCLOSURE OF INVENTION

Technical Problems

The present invention has an objective to provide a silicone elastomer composition in which a cured product thereof is flexible, which provides a silicone elastomer with a small hardness-change even by thermal aging, and in which superior adhesive properties with respect to other silicone elastomers and superior curing properties are exhibited.

In addition, the present invention has another objective to provide a silicone elastomer laminate in which a primer treatment of a substrate is not necessary, good adhesive properties and good integrity are exhibited and flexibility or elasticity is enhanced, and provide a process for producing the laminate.

Technical Solution

The objective of the present invention can be achieved by a silicone elastomer composition comprising:
(A) an organopolysiloxane having two or more silicon atom-bonded alkenyl groups on average in a molecule, in which the content of the alkenyl group is less than 0.2% by weight with respect to the amount of component (A);
(B) an organopolysiloxane having two or more silicon atom-bonded hydrogen atoms on average in a molecule, in which the amount of the silicon atom-bonded hydrogen atoms in component (B) ranges from 2.5 to 10 mol with respect to one mol of the silicon atom-bonded alkenyl group in component (A);
(C) a platinum-group metal-based catalyst, in which the amount by weight of the platinum-group metal in component (C) ranges from 0.01 to 1,000 ppm with respect to the total amount of component (A) and component (B); and
(D) a phthalocyanine compound, in which the amount thereof ranges from 5 to 50 mol with respect to one mol of the platinum-based metal in component (C).

The aforementioned silicone elastomer composition can further comprise (E) a curing retarder.

The aforementioned silicone elastomer composition can further comprise (F) silica fine powder.

The aforementioned silicone elastomer composition can be used as an adhesive.

The aforementioned silicone elastomer composition or the aforementioned adhesive provides a silicone elastomer by means of curing. The aforementioned silicone elastomer preferably has a hardness measured by means of a type C hardness tester specified in JIS K7312 ranging from 5 to 35.

The other objective of the present invention can be achieved by a silicone elastomer laminate characterized in that a substrate and a silicone elastomer is laminated via an adhesion layer formed from the aforementioned silicone elastomer, or a silicone elastomer laminate characterized in that plural silicone elastomers are laminated via adhesion layers comprising the aforementioned silicone elastomer.

The silicone elastomer laminate of the present invention can be obtained by a production process comprising the following steps of:
step 1: forming an adhesion layer by applying the aforementioned silicone elastomer composition or the aforementioned adhesive to the surface of a silicone elastomer, and curing; and
step 2: laminating a silicone elastomer by applying another silicone elastomer composition to the surface of the aforementioned adhesion layer, and curing.

In addition, the silicone elastomer laminate of the present invention can also be obtained by a production process comprising the following steps of:

step 1: forming an adhesion layer by curing the aforementioned silicone elastomer composition or the aforementioned adhesive; and step 2: producing a silicone elastomer laminate by applying another silicone elastomer composition to at least one surface of the aforementioned adhesion layer, and curing.

In addition, the silicone elastomer laminate of the present invention can also be obtained by a production process comprising the step of forming adhesion layer(s) by curing the aforementioned silicone elastomer composition or the aforementioned adhesive among plural silicone elastomers.

Advantageous Effects

The silicone elastomer composition of the present invention can provide a silicone elastomer which has increased flexibility or elasticity and small hardness-change even by thermal aging. Therefore, the aforementioned silicone elastomer can be an adhesion layer which is also an elastic layer. It is not necessary to make the aforementioned adhesion layer thinner. In addition, the silicone elastomer composition of the present invention exhibits superior curing properties, and can form a cured product exhibiting superior adhesive properties with respect to other silicone elastomers. The aforementioned cured product exhibits a releasing property with respect to a metal, and for this reason, molding in a mold can be carried out by using the silicone elastomer composition of the present invention. In addition, the aforementioned cured product can exhibit superior elastomer properties with reduced permanent compression deformation.

In addition, the silicone elastomer laminate of the present invention exhibits good adhesive properties and integrity, and is rich in flexibility and elasticity. In addition, the process for producing the silicone elastomer laminate of the present invention does not require a primer treatment of a substrate, and in accordance with the process, the laminate can be easily obtained without other adhesives.

BEST MODE FOR CARRYING OUT THE INVENTION

First, a silicone elastomer composition of the present invention is described in detail.

An organopolysiloxane of component (A) is a main component of the composition of the present invention, and is characterized by having two or more silicon atom-bonded alkenyl groups on average in one molecule. The content of the alkenyl group is less than 0.2% by weight, and is preferably 0.15% by weight or less of the total amount of the aforementioned component (A). As examples of the silicon atom-bonded alkenyl group in component (A), mention may be made of a vinyl group, an allyl group, a butenyl group, a pentenyl group, a hexenyl group, or a heptenyl group. A vinyl group, an allyl group or a hexenyl group is preferred, and a vinyl group or an allyl group is, in particular, preferred. The bonding position of the aforementioned alkenyl group to the silicon atom is not particularly restricted, and is at the molecular terminal and/or the molecular side chain. In addition, component (A) may have a hydroxyl group or an organic group other than the alkenyl group bonded to the silicon atom. As examples of the aforementioned organic group, mention may be made of, for example, non-substituted or substituted monovalent hydrocarbon groups usually having 1 to 10 carbon atoms, and preferably having 1 to 8 carbon atoms, such as alkyl groups such as a methyl group, an ethyl group, a propyl group, a butyl group, a pentyl group, a hexyl group and the like; cycloalkyl groups such as a cyclopentyl group, a cyclohexyl group and the like; aryl groups such as a phenyl group, a tolyl group, a xylyl group, a naphthyl group and the like; aralkyl groups such as a benzyl group, a phenethyl group and the like; halogen-substituted alkyl groups such as a 3,3,3-trifluoropropyl group, a 3-chloropropyl group and the like; and the like. A methyl group or a phenyl group is preferred.

The molecular structure of component (A) is not particularly restricted. As examples thereof, mention may be made of a linear structure, a branched structure, a linear structure partially having branched chains and a dendrimeric structure. The aforementioned component (A) may be any one of a linear polymer, a homopolymer partially having branched chains and a copolymer comprising the aforementioned molecular structures, or alternatively a mixture of two or more types of the polymers.

The viscosity of component (A) at 25° C. is not particularly restricted. The viscosity preferably ranges from 50 to 1,000,000 mPa·s, more preferably ranges from 200 to 500,000 mPa·s, and in particular, preferably ranges from 1,000 to 100,000 mPa·s, since good operation properties of curing the obtained silicone elastomer composition are exhibited and good physical properties of the obtained silicone elastomer are exhibited. If the viscosity at 25° C. is below the lower limit of the aforementioned range, the physical properties of the obtained silicone elastomer may be remarkably impaired. On the other hand, if the viscosity at 25° C. exceeds the upper limit of the aforementioned range, the handling operation of the obtained silicone elastomer composition may be remarkably impaired. In view of handling properties, component (A) is preferably in the form of a liquid or a paste.

As examples of the aforementioned component (A), mention may be made of a dimethylpolysiloxane of which both molecular terminals are capped with dimethylvinylsiloxy groups, a dimethylpolysiloxane of which both molecular terminals are capped with methylphenylvinylsiloxy groups, a copolymer of methylphenylsiloxane and dimethylsiloxane of which both molecular terminals are capped with dimethylvinylsiloxy groups, a copolymer of dimethylsiloxane and methylvinylsiloxane of which both molecular terminals are capped with trimethylsiloxy groups, a copolymer of dimethylsiloxane and methylvinylsiloxane of which both molecular terminals are capped with dimethylvinylsiloxy groups, methyl(3,3,3-trifluoropropyl)polysiloxane of which both molecular terminals are capped with dimethylvinylsiloxy groups, a copolymer of dimethylsiloxane and methyl(3,3,3-trifluoropropyl)siloxane of which both molecular terminals are capped with dimethylvinylsiloxy groups, a copolymer of dimethylsiloxane and methylvinylsiloxane of which both molecular terminals are capped with silanol groups, a terpolymer of dimethylsiloxane, methyphenylsiloxane and methylvinylsiloxane of which both molecular terminals are capped with silanol groups, and an organosiloxane copolymer formed from siloxane units represented by the following formula: $(CH_3)_3SiO_{1/2}$, siloxane units represented by the following formula: $(CH_3)_2(CH_2=CH)SiO_{1/2}$, siloxane units represented by the following formula: $CH_3SiO_{3/2}$, and siloxane units represented by the following formula: $(CH_3)_2SiO_{2/2}$.

The organopolysiloxane of component (B) is a crosslinker of the composition of the present invention, and is an organopolysiloxane having two or more silicon atom-bonded hydrogen atoms on average in a molecule. The bonding position of the aforementioned silicon atom-bonded hydrogen atom in component (B) is not particularly restricted, and is at the molecular terminal, at the molecular side chain or at the molecular terminal and the molecular side chain. As examples of silicon-bonded groups other than hydrogen atoms in component (B), mention may be made of monovalent hydrocarbon groups containing no aliphatic unsaturated bonds, such as alkyl groups such as a methyl group, an ethyl group, a propyl group, a butyl group, a pentyl group, a hexyl group and the like; cycloalkyl groups such as a cyclopentyl group, a cyclohexyl group and the like; aryl groups such as a phenyl group, a tolyl group, a xylyl group and the like; aralkyl groups such as a benzyl group, a phenethyl group and the like; halogen-substituted alkyl groups such as a 3,3,3-trifluoropropyl group, a 3-chloropropyl group and the like; and the like. An alkyl group or an aryl group is preferred, and in particular, a methyl group or a phenyl group is preferred.

The molecular structure of component (B) is not particularly restricted. As examples thereof, mention may be made of a linear structure, a branched structure, a linear structure partially having branched chains, a cyclic structure and a dendrimeric structure. The aforementioned component (B) may be a homopolymer with the aforementioned molecular structure, a copolymer comprising the aforementioned molecular structure or a mixture thereof.

The viscosity of component (B) is not particularly restricted. The viscosity at 25° C. preferably ranges from 1 to 100,000 mPa·s, more preferably ranges from 1 to 10,000 mPa·s, and in particular, preferably ranges from 1 to 5,000 mPa·s.

As examples of the aforementioned component (B), mention may be made of a methylhydrogenpolysiloxane of which both molecular terminals are capped with trimethylsiloxy groups, a copolymer of methylhydrogensiloxane and dimethylsiloxane of which both molecular terminals are capped with trimethylsiloxy groups, a dimethylpolysiloxane of which both molecular terminals are capped with dimethylhydrogensiloxy groups, a methylhydrogenpolysiloxane of which both molecular terminals are capped with dimethylhydrogensiloxy groups, a copolymer of methylhydrogensiloxane and dimethylsiloxane of which both molecular terminals are capped with dimethylhydrogensiloxy groups, a cyclomethylhydrogenpolysiloxane, an organosiloxane formed from siloxane units represented by the following formula: $(CH_3)_3SiO_{1/2}$, siloxane units represented by the following formula: $(CH_3)_2HSiO_{1/2}$, and siloxane units represented by the following formula: $SiO_{4/2}$, a tetra(dimethylhydrogensiloxy)silane, and a methyltri(dimethylhydrogensiloxy)silane.

In the composition of the present invention, the content of component (B) is an amount so that the amount of the silicon atom-bonded hydrogen atoms in component (B) ranges from 2.5 to 10 mol, preferably ranges from 2.5 to 8 mol and in particular, preferably ranges from 2.8 to 6 mol with respect to one mol of the silicon atom-bonded alkenyl group in component (A). If the amount of the aforementioned component is below the lower limit of the aforementioned range, sufficient adhesive properties of the obtained silicone elastomer composition with respect to the silicone elastomer may not be obtained. On the other hand, if the amount exceeds the upper limit of the aforementioned range, hydrogen gas may generate from the obtained silicone elastomer. Therefore, the relative amount of the aforementioned component (B) with respect to 100 parts by weight of the aforementioned component (A) is preferably determined, for example, in the range of 1 part by weight to 1,000 parts by weight so that the aforementioned relationship can be maintained.

The platinum-group metal-based catalyst of component (C) is a catalyst for accelerating curing of the composition of the present invention. As examples of component (C), mention may be made of platinum-based catalysts such as platinum fine powder, platinum black, chloroplatinic acid, platinum tetrachloride, an alcohol-modified chloroplatinic acid, an olefin complex of platinum, an alkenylsiloxane complex of platinum, a carbonyl complex of platinum, thermoplastic organic resin powder such as methyl methacrylate resin, polycarbonate resin, polystyrene resin, silicone resin or the like, each containing the aforementioned platinum-based catalyst and the like; rhodium-based catalysts represented by the following formula: $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX_3[(R)_2S]_3$, $(R'_3P)_2Rh(CO)X$, $(R^2_3P)_2Rh(CO)H$, $Rh_2X_2Y_4$, $H_fRh_g(En)_hCl_i$ or $Rh[O(CO)R]_{3-j}(OH)_j$, wherein X is a hydrogen atom, a chlorine atom, a bromine atom or an iodine atom; Y is an alkyl group such as a methyl group, an ethyl group or the like, CO, $C_8H_{14}$ or $0.5C_3H_{12}$; R is an alkyl group such as a methyl group, an ethyl group, a propyl group or the like; a cycloalkyl group such as a cycloheptyl group, a cyclohexyl group or the like; or an aryl group such as a phenyl group, a xylyl group or the like; R' is an alkyl group such as a methyl group, an ethyl group, a propyl group or the like; an aryl group such as a phenyl group, a tolyl group, a xylyl group or the like, an alkoxy group such as a methoxy group, an ethoxy group or the like, or an aryloxy group such as a phenoxy group or the like; En is an olefin such as ethylene, propylene, butene, hexene or the like; f is 0 or 1; g is 1 or 2; h is an integer ranging from 1 to 4; i is 2, 3 or 4; and j is 0 or 1; and iridium-based catalysts represented by the following formula: $Ir(OOCCH_3)_3$, $Ir(C_5H_7O_2)_3$, $[Ir(Z)(En)_2]_2$, or $[Ir(Z)(Dien)]_2$, wherein Z is a chlorine atom, a bromine atom, an iodine atom or an alkoxy group such as a methoxy group, an ethoxy group or the like; En is an olefin such as ethylene, propylene, butene, hexene or the like; and Dien is cyclooctadiene.

In the composition of the present invention, the content of component (C) with respect to the total amount of component (A) and component (B) is an amount so that the amount by weight unit of the platinum-group metal ranges from 0.01 to 1,000 ppm and preferably ranges from 0.1 to 500 ppm. If the amount of component (C) is below the lower limit of the aforementioned range, the obtained silicone elastomer composition may not be sufficiently cured. On the other hand, even if component (C) is blended in an amount exceeding the upper limit of the aforementioned range, the curing rate of the obtained silicone elastomer composition may not be remarkably improved.

The phthalocyanine compound of compound (D) is a component for providing a silicone elastomer in which the hardness change is small even by thermal aging. In general, the phthalocyanine compounds can be broadly divided into a metal-free phthalocyanine in which no metal is present in the center of a porphyrazine ring and a metal phthalocyanine in which a metal is present in the center of a porphyrazine ring. In the present invention, both of these can be used. The metal phthalocyanines have covalent binding or ion binding, depending on the type of metal, and both of these can be used herein.

Therefore, as examples of the phthalocyanine compounds, mention may be made of, for example, those represented by the following formula:

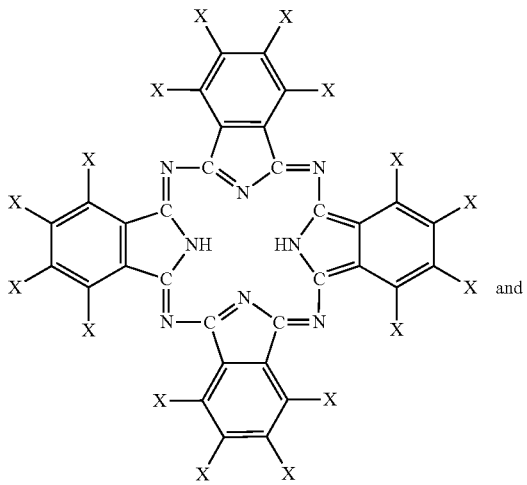

[Chem. 1]

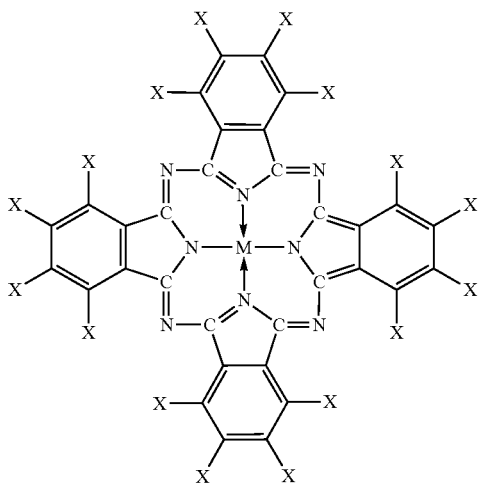

[Chem. 2]

wherein
X is a hydrogen atom or a halogen atom, and is preferably a chlorine atom or a bromine atom; and M is a metal atom such as iron, cobalt, nickel, copper, platinum or the like.

As the metal, lithium, sodium, potassium, beryllium, calcium, magnesium, barium, mercury, vanadium, zinc, aluminum or the like can also be used.

In the composition of the present invention, the blending amount of component (D) ranges from 5 to 50 mol with respect to one mol of the platinum-group metal of component (C). If the amount is below the lower limit of the aforementioned range, hardness change due to thermal aging may increase. On the other hand, if component (D) is blended in an amount exceeding the upper limit of the aforementioned range, curing properties may be affected. Therefore, the relative amount of component (D) with respect to 100 parts by weight of the aforementioned component (A) is preferably determined, for example, in the range of 0.0001 parts by weight to 1 part by weight, more preferably in the range of 0.001 to 0.02 parts by weight and in particular, preferably in the range of 0.001 to 0.01 parts by weight so that the aforementioned relationship can be maintained.

The composition of the present invention preferably contains the curing retarder (E) such as an acetylene compound such as 2-methyl-3-butyn-2-ol, 2-phenyl-3-butyn-2-ol, 1-ethynyl-1-cyclohexanol or the like; an ene-yne compound such as 3-methyl-3-penten-1-yne, 3,5-dimethyl-3-hexen-1-yne or the like; a hydrazine-based compound, a phosphine-based compound, a mercaptan-based compound, and the like, in order to adjust the curing rate of the aforementioned composition and improve handling operation properties. The amount of the curing retarder of preventing the curing reaction is not particularly limited, and preferably ranges from 0.0001 parts by weight to 1.0 part by weight with respect to 100 parts by weight of component (A).

In addition, the composition of the present invention preferably contains silica fine powder (F) as a reinforcement material of a cured product of the aforementioned composition. Namely, the composition of the present invention is preferably used as a molding material in a mold. In this case, increased tensile strength and elongation are, in particular, required in order to prevent breakages during releasing from a mold. Therefore, a cured product satisfying the aforementioned strength properties can be obtained by using silica fine powder as the reinforcement material in the composition of the present invention. The silica fine powder as component (F) may possess a specific surface area measured by means of a BET method, which is preferably 50 $m^2/g$ or more, and more preferably ranges from 100 to 300 $m^2/g$. If the specific surface area is below 50 $m^2/g$, the satisfied strength properties may not be imparted in some cases.

As the silica fine powder, for example, fumed silica, precipitated silica or the like can be used. The aforementioned silicas have a large amount of silanol groups on the surface thereof. For this reason, so-called hydrophobic silica in which the aforementioned silica is subjected to a surface treatment with a silylation agent such as silane halide, alkoxysilane, various silazane compounds such as hexamethyldisilazane, tetramethyldivinyldisilazane or the like can also be used. Instead of using the hydrophobic silica, a master batch obtained by mixing the organopolysiloxane of component (A), the aforementioned silica fine powder and the aforementioned silylation agent can also be used. The blending amount of the silica fine powder preferably ranges from 1 to 10% by weight, more preferably ranges from 1 to 8% by weight and in particular, preferably ranges from 1 to 6% by weight with respect to the amount of the composition of the present invention. If the blending amount exceeds 10% by weight, molding operation properties of the composition may be impaired.

In the composition of the present invention, various additives may be blended as optional components other than the aforementioned components within the range which does not impair the purpose of the present invention, such as reinforcement fillers such as fumed titanium oxide and the like; non-reinforcement fillers such as diatomaceous earth, asbestos, aluminosilicic acid, iron oxide, zinc oxide, calcium carbonate and the like; thermal-conductive fillers such as aluminum oxide, molten silica, silver powder and the like; surface-treated fillers in which the aforementioned fillers are subjected to a surface treatment with an organosilicon compound such as organosilane, organopolysiloxane or the like; and carbon blacks such as acetylene black, furnace black, channel black, and the like. In addition, additives which are known as additives for silicone elastomer compositions may be blended, such as pigments, dyes, thermal resistant agents, flame retardants, mold release agents, plasticizers, non-functional silicone oils and the like, if necessary.

The composition of the present invention or the adhesive comprising the composition of the present invention can exhibit excellent adhesive properties without the addition of an adhesion promoting additive. The composition of the present invention or the adhesive comprising the composition of the present invention may comprise no adhesion promoting additive. However, within the range which does not impair the purpose of present invention, such an adhesion promoting additive can be blended into the composition of the present invention for the purpose of improving the adhesion to a substrate such as a plastic. The adhesion promoting additive may be present in the composition of the present invention in an amount of 0.05-5% by weight of the total weight of the composition. As examples of the adhesion promoting additive, mention may be made of: a silane coupling agent such as an alkenyl functional alkoxysilane, an acryloxy functional alkoxysilane or a methacryloxy functional alkoxysilane, and an epoxy functional alkoxysilane;

an organotitanium compound having an organic group or groups attached to the titanium through a titanium-oxygen-carbon linkage, such as tetraisopropoxytitanate, tetramethoxyethoxytitanate, and diisopropyldiacetoxytitanate;

a metal chelate including acetyl acetonates such as triacetyl acetonates of aluminium, tetraacetyl acetonates of zirconium, acetyl acetonates of titanium and triacetylacetonates of iron;

an epoxy functional organopolysiloxane oligomer;

an organopolysiloxane oligomer having silicon bonded alkoxy group, epoxy group, and/or alkenyl group;

a reaction mixture of epoxy functional alkoxysilane and amino functional silane;

an isocyanate compound and its derivatives.

The composition of the present invention can be easily produced by uniformly mixing a composition in which the aforementioned components (A) to (D), and preferably the aforementioned components (A) to (D), as well as, component (E) and/or component (F), and the aforementioned various additives, if necessary, are blended, by means of a conventional mixing means. As examples of the mixing means used herein, mention may be made of a homo mixer, a paddle mixer, a homo disperser, a colloidal mill, or a vacuum agitator and the like. The mixing means is not particularly restricted, as long as at least components (A) to (D) can be uniformly mixed. In the case of blending silica fine powder (F), it is preferable that after a silica master batch is prepared by blending a part of component (A) and silica fine powder (F), the remainder of component (A) and other components are mixed therewith.

The composition of the present invention can be used, as it is, or alternatively by further blending other optional components, as an adhesive. Therefore, the present invention also relates to an adhesive comprising the aforementioned silicone elastomer composition. The aforementioned adhesive exhibits adhesive properties with respect to silicone elastomers, and in particular, exhibits superior adhesive properties with respect to silicone elastomers of an addition reaction-curable type utilizing a hydrosilylation reaction. For this reason, in the case of using the adhesive to a substrate comprising a silicone elastomer, it is not necessary to preliminarily subject the aforementioned substrate to a primer treatment.

The composition of the present invention or the adhesive comprising the composition of the present invention forms a cured product by means of heating. The curing temperatures are not particularly restricted. In general, curing can be carried out well at the temperatures ranging from room temperature to 220° C. Curing is preferably carried out at 60 to 180° C. and more preferably at 80 to 150° C., since adhesion between the silicone elastomers or adhesion between the silicone elastomer and the substrate is further enhanced. In addition, when a step-up curing, in which at first, heating is carried out at room temperature to 100° C. and preferably at 60 to 80° C., and subsequently, heating is carried out at 80 to 180° C. and preferably at 100 to 150° C., is carried out, adhesion between the silicone elastomers or adhesion between the silicone elastomer and the substrate may be improved in some cases. Therefore, step-up curing is preferred. After the curing is completed, a secondary curing (thermal aging) is preferably carried out for about 10 minutes to 2 hours at 150 to 250° C. in order to remove a small amount or a trace amount of volatile components.

A cured product of the composition of the present invention preferably possesses an Asker C hardness ranging from 5 to 35. The Asker C hardness is a hardness which is specified in JIS K7312 and mainly applied to a flexible elastomer. In the present invention, the Asker C hardness indicates a value measured by means of a type C hardness tester specified in JIS K7312. For example, the Asker C hardness of 20 means that the value measured by the aforementioned tester is 20. In the Asker C hardness, as the value thereof increases, "hardness" increases. If the Asker C hardness exceeds 35, flexibility of the cured product may be impaired. For this reason, the Asker C hardness is preferably 35 or less, more preferably ranges from 10 to 30, and in particular, more preferably ranges from 10 to 25. If the hardness of the cured product of the composition of the present invention should be within an appropriate range by reducing a crosslinking density of the cured product, component (A) in which the content of the silicon atom-bonded alkenyl group is reduced, component (B) in which the content of silicon atom-bonded hydrogen atom is reduced, or both of these can be used.

The aforementioned cured product can be a silicone elastomer possessing increased flexibility or elasticity and reduced permanent compression deformation. In addition, even after the secondary curing, change in hardness can be reduced. In addition, the aforementioned cured product can exhibit a superior adhesive property with respect to other silicone elastomers. The aforementioned cured product can have a releasing property with respect to a metal, and for this reason, the shape of the aforementioned cured product can be freely designed with a mold.

The present invention also relates to a silicone elastomer laminate in which a substrate and a silicone elastomer or elastomers is/are laminated via an adhesion layer layers comprising the aforementioned silicone elastomer. Next, the silicone elastomer laminate and a process for producing the laminate of the present invention are described in detail.

The material and shape of the aforementioned substrate is not particularly restricted. The substrates can be formed from various inorganic materials such as metals, glass, quartz and the like, various organic materials such as elastomers, thermosetting resins, thermoplastic resins and the like, or constituted from various structures such as woven fabrics, non-woven fabrics or porous products. In addition, the substrates can be in the various forms of plates, bars, semispheres, spheres and the like.

The aforementioned substrate is preferably a silicone elastomer, and in particular, preferably an addition reaction-cured silicone elastomer utilizing a hydrosilylation reaction. Therefore, in the present invention, a silicone elastomer laminate in which plural silicone elastomers are laminated via adhesion layers comprising the aforementioned silicone elastomer can be preferably produced.

The process for producing the silicone elastomer laminate of the present invention is not particularly restricted. For example, the laminate can be produced in accordance with the following processes.

(1) Process containing the following steps 1 and 2, characterized by applying the aforementioned silicone elastomer composition on a cured silicone elastomer, and curing.

Step 1: forming an adhesion layer by applying the silicone elastomer composition of the present invention or the adhesive of the present invention to the surface of a silicone elastomer and curing; and Step 2: laminating a silicone elastomer by applying another silicone elastomer composition to the surface of the aforementioned adhesion layer, and curing.

(2) Process containing the following steps 1 and 2, characterized by applying an uncured another silicone elastomer composition on a cured silicone elastomer composition, and curing.

Step 1: forming an adhesion layer by curing the silicone elastomer composition of the present invention or the adhesive of the present invention; and Step 2: producing a silicone elastomer laminate by applying another silicone elastomer composition to at least one surface of the aforementioned adhesion layer, and curing.

In the aforementioned process (2), the aforementioned other silicone elastomer composition is preferably applied to both surfaces of the aforementioned adhesion layer and then cured.

(3) Process containing the following step characterized by applying the aforementioned silicone elastomer composition among cured silicone elastomers, and curing.

Step: forming an adhesion layer or layers by curing the silicone elastomer composition of the present invention or the adhesive of the present invention among plural silicone elastomers.

The silicone elastomer laminate obtained in each of the aforementioned production processes can exhibit good adhesive properties and good integrity, and can be rich in flexibility or elasticity. In addition, in each of the aforementioned production processes, no primer treatment of a substrate may be required, and the silicone elastomer laminate can be easily produced without other adhesives.

An additional layer or layers such as an actyl resin layer, a fluorine resin layer and the like can be provided on the surface of the silicone elastomer laminate of the present invention.

The thickness of each of the layers constituting the silicone elastomer laminate of the present invention is not particularly restricted. For example, the aforementioned adhesion layer can have a thickness exceeding 100 μm, further exceeding 500 μm, and further exceeding 1 mm. Therefore, in the present invention, the adhesion layer can also be an elastic layer. In addition, the thickness of each of the layers may be the same or different to one another.

EXAMPLES

Hereinafter, the present invention is described in detail with reference to examples. It should be understood that the present invention is not restricted to the examples. In the following description, "%" indicates % by weight, unless otherwise specified.

Preparation of Silica Base 100 g of an organopolysiloxane (both terminal vinyl polymer; viscosity=40,000 mPa·s, content of the vinyl group=0.09%), 2 g of water, 7 g of hexamethyldisilazane and 40 g of fumed silica (specific surface area=200 m$^2$/g) were placed in a kneader mixer, and mixed for one hour at room temperature. Subsequently, the mixture was mixed for 2 hours at 170° C. under vacuum, and further mixed for one hour while the mixture was being cooled to room temperature. Thereby, a silica base was prepared.

Examples 1 to 8 and Comparative Examples 1 to 5 The components shown in Table 1 and Table 2 described below were uniformly mixed. Thereby, liquid silicone elastomer compositions which were addition reaction-curable of Examples 1 to 8 and Comparative Examples 1 to 5 were obtained.

The following properties were measured on each of the compositions of Examples 1 to 8 and Comparative Examples 1 to 5. The results are shown in Table 1 and Table 2.

Asker C Hardness 1

After the composition was heated and cured for 10 minutes at 120° C., the hardness thereof was measured by means of a type C hardness tester specified in JIS K7312.

Asker C Hardness 2

After the composition was heated and cured for 4 hours at 200° C., the hardness thereof was measured by means of a type C hardness tester specified in JIS K7312.

Asker C Hardness Difference

An Asker C hardness difference was obtained by subtracting Asker C hardness 1 from Asker C hardness 2.

Curing Property

The curing property was measured by means of a curelastometer. More particularly, when torque after elapsing of 3 minutes at 130° C. was 100, the period for achieving 10% of the aforementioned torque was measured.

Permanent Compression Deformation

The permanent compression deformation was measured in accordance with JIS K6262. More particularly, compression deformation corresponding to 25% of the thickness was exerted for 22 hours at 180° C., and the thickness after 30 minutes was measured. The permanent compression deformation was obtained in accordance with the following equation:

$$\text{Permanent compression deformation (\%)} = \{(t_0 - t_1)/(t_0 - t_2)\} \times 100$$

wherein $t_0$: original thickness of a specimen, $t_1$: thickness of a specimen 30 minutes after the specimen was ejected from the compression device, $t_2$: thickness of the specimen under the condition of exerting compression deformation.

Adhesive Property 10 g of the aforementioned silica base (content of vinyl group=0.064%), 3 g of hydrophobic iron oxide {mixture obtained by mixing and kneading 100 g of an organopolysiloxane (both terminal vinyl polymer; viscosity=10,000 mPa·s, content of vinyl group=0.13%) and 40 g of Bayferrox 130M (iron oxide) manufactured by Bayer (content of vinyl group=0.072%)}, 50 g crystalline silica (Crystalite VX-S2, manufactured by Tatsumori Ltd., average particle size=5 μm), 83 g of an organopolysiloxane (side chain vinyl polymer; viscosity=7,000 mPa·s, content of vinyl group=0.30%), 0.2 g of a platinum catalyst (content of the platinum metal=5%, isopropyl alcohol solution), 0.04 g of a curing retarder (ethynylcyclohexanol) and 1.4 g of both terminal and side chain SiH curing agent {MHD$_{12}$DH$_3$ MH wherein MH: Me$_2$HSiO$_{1/2}$, D: Me$_2$SiO$_{2/2}$, DH: MeHSiO$_{2/2}$, Me: CH$_3$); viscosity=10 mPa·s, content of SiH=0.39%} were placed in a kneader mixer and mixed for 30 minutes at room temperature. Thereby, Adherend Composition 1 (SiH/Vi molar ratio=0.6) was obtained.

Subsequently, after the obtained Adherend Composition 1 was press-cured for 15 minutes at 120° C., the composition was post-cured in an oven for 4 hours at 200° C. Thereby, two cured bodies (cylindrical shape) of Adherend Composition 1 were obtained. The density thereof was 1.27 g/cm$^3$ and the hardness thereof was 6 (JIS type A).

Between the two cylindrical cured bodies described above, each of the compositions of Examples 1 to 8 and Comparative Examples 1 to 5 was applied, followed by heating for 4 hours at 200° C. to cure the aforementioned composition. A cured product of each of the compositions was separated from the aforementioned cured bodies. The case in which cohesion failure was observed on the separated surface was evaluated as 0 and the case in which adhesion failure was observed on the separated surface was evaluated as X.

TABLE 1

|  | Example 1 | Example 2 | Example 3 | Example 4 | Example 5 | Example 6 | Example 7 | Example 8 |
|---|---|---|---|---|---|---|---|---|
| Silica base | — | 14 | 14 | 14 | 14 | 14 | 14 | 14 |
| Organopolysiloxane 1 | 100 | 90 | 90 | 90 | 90 | 90 | 90 | 90 |
| Crystalline silica | 20 | — | — | — | — | — | — | — |
| Iron oxide | 2 | 2 | — | 2 | 2 | 2 | 2 | 2 |
| Phthalocyanine compound | 0.00649 | 0.00649 | 0.00649 | 0.013 | 0.013 | 0.013 | 0.013 | 0.013 |
| Platinum catalyst | 0.1 | 0.1 | 0.1 | 0.1 | 0.1 | 0.1 | 0.1 | 0.1 |
| Curing retarder | 0.04 | 0.04 | 0.04 | 0.04 | 0.04 | 0.04 | 0.04 | 0.04 |
| $MD_5D^H{}_5M$ | — | — | — | — | — | — | — | 2.70 |
| $MD_7D^H{}_3M$ | 5.30 | 5.24 | 5.24 | 7.20 | — | — | — | — |
| $MD_{15}D^H{}_3M$ | — | — | — | — | 8.10 | 11.60 | — | — |
| $MD_{27}D^H{}_3M$ | — | — | — | — | — | — | 9.60 | — |
| SiH/Vi (molar ratio) | 3.9 | 3.9 | 3.9 | 5.3 | 3.8 | 5.5 | 2.8 | 4.4 |
| Asker C hardness 1 | 20 | 18 | 18 | 16 | 16 | 11 | 21 | 30 |
| Asker C hardness 2 | 25 | 23 | 23 | 17 | 16 | 12 | 24 | 31 |
| Asker C hardness Difference | 5 | 5 | 5 | 1 | 0 | 1 | 3 | 1 |
| Hardness property | 36 | 36 | 36 | 34 | 38 | 33 | 48 | 34 |
| Permanent compression Deformation | 17 | 17 | 17 | 15 | 7 | 16 | 6 | 10 |
| Adhesive property | ○ | ○ | ○ | ○ | ○ | ○ | ○ | ○ |

Organopolysiloxane 1: copolymer of methylvinylsiloxane and dimethylsiloxane of which both molecular terminals are capped with trimethylsilyl groups (viscosity = 40,000 mPa · s, content of vinyl group = 0.12%)
Crystalline silica: Crystalite VX-S2 (manufactured by Tatsumori Ltd., average particle size = 5 μm)
Iron oxide: Bayferrox 130M (average particle size = 0.17 μm) manufactured by Bayer
Phthalocyanine compound: Phthalocyanine blue (Lionel Blue FC-7330, manufactured by Toyo Ink MFG, Co., Ltd.)
Platinum catalyst: content of platinum metal = 5%, isopropyl alcohol solution
Curing retarder: ethynylcyclohexanol
$MD_5D^H{}_5M$: side chain SiH curing agent (viscosity = 5 mPa · s, content of SiH = 0.74%)
$MD_7D^H{}_3M$: side chain SiH curing agent (viscosity = 10 mPa · s, content of SiH = 0.33%)
$MD_{15}D^H{}_3M$: side chain SiH curing agent (viscosity = 15 mPa · s, content of SiH = 0.21%)
$MD_{27}D^H{}_3M$: side chain SiH curing agent (viscosity = 25 mPa · s, content of SiH = 0.13%)
wherein
M: $Me_3SiO_{1/2}$
MH: $Me_2HSiO_{1/2}$
D: $Me_2SiO_{2/2}$
DH: $MeHSiO_{2/2}$
Me: $CH_3$

TABLE 2

|  | Comparative Example 1 | Comparative Example 2 | Comparative Example 3 | Comparative Example 4 | Comparative Example 5 |
|---|---|---|---|---|---|
| Silica base | — | 14 | 14 | 14 | 14 |
| Organopolysiloxane 1 | 100 | 90 | 90 | 90 | 63 |
| Organopolysiloxane 2 | — | — | — | — | 27 |
| Crystalline silica | 20 | — | — | — | — |
| Iron oxide | 2 | 2 | 2 | 2 | 2 |
| Phthalocyanine compound | — | — | 0.013 | 0.013 | 0.013 |
| Platinum catalyst | 0.1 | 0.1 | 0.1 | 0.1 | 0.1 |
| Curing retarder | 0.04 | 0.04 | 0.04 | 0.04 | 0.04 |
| $MD_5D^H{}_5M$ | — | — | — | — | 4.00 |
| $MD_7D^H{}_3M$ | 5.24 | 5.24 | — | — | — |
| $MD_{15}D^H{}_3M$ | — | — | 4.90 | — | — |
| $MD_{27}D^H{}_3M$ | — | — | — | 7.02 | — |
| SiH/Vi (molar ratio) | 3.9 | 3.9 | 2.3 | 2.0 | 3.5 |
| Asker C hardness 1 | 20 | 18 | 19 | 19 | 39 |
| Asker C hardness 2 | 34 | 33 | 20 | 20 | 39 |
| Asker C hardness difference | 14 | 15 | 1 | 1 | 0 |
| Curing property | 32 | 33 | 55 | 55 | 30 |
| Permanent compression deformation | 39 | 40 | 5 | 5 | 9 |
| Adhesive property | ○ | ○ | x | x | x |

Organopolysiloxane 1: copolymer of methylvinylsiloxane and dimethylsiloxane of which both molecular terminals are capped with trimethylsilyl groups (viscosity = 40,000 mPa · s, content of vinyl group = 0.12%)
Organopolysiloxane 2: copolymer of methylvinylsiloxane and dimethylsiloxane of which both molecular terminals are capped with trimethylsilyl groups (viscosity = 40,000 mPa · s, content of vinyl group = 0.50%)
Crystalline silica: Crystalite VX-S2 (manufactured by Tatsumori Ltd., average particle size = 5 μm)
Iron oxide: Bayferrox 130M (average particle size = 0.17 μm) manufactured by Bayer
Phthalocyanine compound: Phthalocyanine blue (Lionol Blue FC-7330, manufactured by Toyo Ink MFG, Co., Ltd.)
Platinum catalyst: content of platinum metal = 5%, isopropyl alcohol solution
Curing retarder: ethynylcyclohexanol TABLE 2-continued

|  | Comparative Example 1 | Comparative Example 2 | Comparative Example 3 | Comparative Example 4 | Comparative Example 5 |
|---|---|---|---|---|---|

$MD_5D^{H}{}_5M$: side chain SiH curing agent (viscosity = 5 mPa · s, content of SiH = 0.74%)
$MD_7D^{H}{}_3M$: side chain SiH curing agent (viscosity = 10 mPa · s, content of SiH = 0.33%)
$MD_{15}D^{H}{}_3M$: side chain SiH curing agent (viscosity = 15 mPa · s, content of SiH = 0.21%)
$MD_{27}D^{H}{}_3M$: side chain SiH curing agent (viscosity = 25 mPa · s, content of SiH = 0.13%)
wherein
M: $Me_3SiO_{1/2}$
MH: $Me_2HSiO_{1/2}$
D: $Me_2SiO_{2/2}$
DH: $MeHSiO_{2/2}$
Me: $CH_3$ As is apparent from Table 1 and Table 2, in Examples 1 to 8, the hardness change due to thermal aging is small, and the flexible silicone elastomer is provided. In addition, good adhesive properties with respect to other silicone elastomers are exhibited.

On the other hand, in Comparative Examples 1 and 2, the hardness change due to thermal aging is large since no phthalocyanine compound is used. In addition, the hardness of the cured product after thermal aging is also increased, and poor flexibility is exhibited. In addition, the permanent compression deformation is increased, and poor properties as elastomers are exhibited.

In addition, in Comparative Examples 3 and 4, since the molar ratio of the silicon atom-bonded hydrogen atoms with respect to the silicon atom-bonded alkenyl group in the composition is less than 2.5, poor adhesive properties with respect to other silicone elastomers are exhibited. In addition, curing properties thereof are also inferior to those of Examples 1 to 8.

In Comparative Example 5, since the side chain vinyl polymer (organopolysiloxane 2) in which the content of the alkenyl group exceeds 0.2% by weight, the hardness of the cured product is increased, and poor adhesive properties with respect to other silicone elastomers are exhibited.

Evaluation of Adhesive Properties with Respect to Various Silicone Elastomers

The adhesive properties with respect to various silicone elastomers were further evaluated on the elastomer composition of Example 2 as a representative example of Examples 1 to 8. First, Adherend Compositions 2 to 4 were prepared as described below.

Adherend Composition 2

60 g of the aforementioned hydrophobic iron oxide, 250 g of alumina powder (manufactured by Showa Denko K.K., average particle size=2 μm, reduced amount by heating=0.18% by weight) and 64 g of an organopolysiloxane (side chain vinyl polymer; viscosity=7,000 mPa·s, content of vinyl group=0.30%) were placed in a kneader mixer. The mixture was mixed for one hour at 170° C., and subsequently cooled to room temperature. Subsequently, 0.5 g of tetra(n-propoxysilane), 0.5 g of a platinum catalyst (content of platinum metal=5%, isopropyl alcohol solution), 0.15 g of a curing retarder (ethynylcyclohexanol), 0.6 g of a side chain SiH curing agent {$MD_5DH_5M$ wherein M: $Me_3SiO_{1/2}$, D: $Me_2SiO_{2/2}$, DH: $MeHSiO_{2/2}$, Me: $CH_3$); viscosity=5 mPa·s, content of SiH=0.74%} and 2.9 g of a both terminal SiH curing agent ($MHD_{14}MH$ wherein MH: $Me_2HSiO_{1/2}$, D: $Me_2SiO_{2/2}$, Me: $CH_3$); viscosity=10 mPa·s, content of SiH=0.14%} were placed in a kneader mixer, and the mixture was mixed for 30 minutes at room temperature. Thereby, Adherend Composition 2 (SiH/Vi molar ratio=1.0) was obtained.

Adherend Composition 3

28 g of the aforementioned silica base (content of vinyl group=0.064%), 45 g of crystalline silica (Crystalite VX-S2 (manufactured by Tatsumori Ltd., average particle size=5 μm), 16 g of an organopolysiloxane (side chain vinyl polymer; viscosity=40,000 mPa·s, content of vinyl group=0.50%), 64 g of an organopolysiloxane (side chain vinyl polymer; viscosity=7,000 mPa·s, content of vinyl group=0.30%), 0.25 g of a platinum catalyst (content of the platinum metal=5%, isopropyl alcohol solution), 0.06 g of a curing retarder (ethynylcyclohexanol), 0.7 g of a side chain SiH curing agent {$MD_5DH_5M$ wherein M: $Me_3SiO_{1/2}$, D: $Me_2SiO_{2/2}$, DH: $MeHSiO_{2/2}$, Me: $CH_3$); viscosity=5 mPa·s, content of SiH=0.74%}, and 4.1 g of a both-terminal SiH curing agent {$MHD_{14}$ MH wherein MH: $Me_2HSiO_{1/2}$, D: $Me_2SiO_{2/2}$, Me: $CH_3$); viscosity=10 mPa·s, content of SiH=0.14%} were placed in a kneader mixer, and the mixture was mixed for 30 minutes at room temperature. Thereby, Adherend Composition 3 (molar ratio of SiH/Vi=1.0) was obtained.

Adherend Composition 4

120 g of the aforementioned silica base (content of vinyl group=0.064%), 15 g of an organopolysiloxane (both terminal vinyl polymer; viscosity=40,000 mPa·s, content of vinyl group=0.09%), 0.1 g of a platinum catalyst (content of platinum metal=5%, isopropyl alcohol solution), 0.02 g of a curing retarder (ethynylcyclohexanol), 0.7 g of a side chain SiH curing agent {$MD_5DH_5M$ wherein M: $Me_3SiO_{1/2}$, D: $Me_2SiO_{2/2}$, DH: $MeHSiO_{2/2}$, Me: $CH_3$); viscosity=5 mPa·s, content of SiH=0.74%} were placed in a kneader mixer, and the mixture was mixed for 30 minutes at room temperature. Thereby, Adherend Composition 4 (molar ratio of SiH/Vi=1.5) was obtained.

Case 1

Next, the obtained Adherend Compositions 2 to 4 were press-cured for 15 minutes at 120° C., and then post-cured for 4 hours at 200° C. in an oven. Thereby, two cured bodies (in the form of a cylinder) of each of Adherend Compositions 2 to 4 were obtained. The density thereof was respectively 2.25 g/cm³, 1.23 g/cm³, and 1.13 g/cm³, and the hardness thereof was respectively 32, 32 and 36 (JIS type A). Between the aforementioned two cylindrical cured bodies, the composition of Example 2 was applied, followed by heating for 4 hours at 200° C. Thereby, the aforementioned composition was cured. The cured product of each of the compositions was separated from the aforementioned cured bodies. The case in which cohesion failure was observed on the separated surface was evaluated as 0 and the case in which an adhesion failure was observed on the separated surface was evaluated as X. The results are shown in Table 3.

Case 2

Next, the composition of Example 2 was press-cured for 15 minutes at 120° C., and then post-cured for 4 hours at 200° C.

in an oven. Thereby, two cylindrical cured bodies were obtained. Subsequently, between the two aforementioned cylindrical cured bodies, each of Adherend Compositions 2 to 4 was applied, followed by heating for 4 hours at 200° C. Thereby, the aforementioned composition was cured. The cured product of each of the compositions was separated from the aforementioned cured bodies. The case in which cohesion failure was observed on the separated surface was evaluated as ○ and the case in which an adhesion failure was observed on the separated surface was evaluated as x. The results are shown in Table 3.

TABLE 3

|  | Adherend Composition 2 | Adherend Composition 3 | Adherend Composition 4 |
|---|---|---|---|
| Adhesive properties (Case 1) | ○ | ○ | ○ |
| Adhesive properties (Case 2) | ○ | ○ | ○ |

As is apparent from Table 3, the elastomer composition of the present invention exhibits good adhesive properties with respect to various silicone elastomers.

INDUSTRIAL APPLICABILITY

The silicone elastomer laminates of the present invention can be used as various electric or electronic parts or medical products such as bandages and the like, as they are. In addition, the laminates can be used in combination with various substrates such as metal substrates, metal oxide substrates, glass substrates, plastic films and the like.

In the field of architecture, the silicone elastomer laminates of the present invention can be utilized in interior decorating and/or processing materials, electric cases, sheets, glass intermediate films, glass replacement goods, and solar cell peripheral materials. In the field of agriculture, for example the laminates can be utilized in films for covering greenhouses.

The silicone elastomer laminates of the present invention can be utilized in organic EL device peripheral materials, organic photorefractive elements, optical amplification elements which are light-light conversion devices, optical arithmetic elements, substrate materials of organic solar cell peripheral parts, fiber materials, sealants of elements and the like as next-generation photoelectron functional organic materials.

In addition, the silicone elastomer laminates of the present invention can be suitably used even in electronic components installing heater elements, electronic components installed in vehicles which are exposed to high temperatures.

The invention claimed is:

1. A silicone elastomer laminate wherein:
a silicone elastomer substrate; and
a silicone elastomer having a hardness measured by a type C hardness tester specified in JIS K7312 ranging from 5 to 35 and obtained by curing a silicone elastomer composition comprising:
(A) an organopolysiloxane having two or more silicon atom-bonded alkenyl groups on average in a molecule, in which a content of the alkenyl group is less than 0.2% by weight with respect to an amount of component (A);
(B) an organopolysiloxane having two or more silicon atom-bonded hydrogen atoms on average in a molecule, in which an amount of the silicon atom-bonded hydrogen atoms in component (B) ranges from 2.5 to 5.5 mol with respect to one mol of the silicon atom-bonded alkenyl group in component (A);
(C) a platinum-group metal-based catalyst, in which an amount by weight of a platinum-group metal in component (C) ranges from 0.01 to 1,000 ppm with respect to the total amount of component (A) and component (B); and
(D) a phthalocyanine compound, in which an amount thereof ranges from 7.7 to 15.4 mol with respect to one mol of the platinum-based metal in component (C);
are laminated via an adhesion layer comprising the silicone elastomer composition.

2. The silicone elastomer laminate according to claim 1, wherein the silicone elastomer composition further comprises (E) a curing retarder.

3. The silicone elastomer laminate according to claim 1, wherein the silicone elastomer composition further comprises (F) silica fine powder.

4. The silicone elastomer laminate according to claim 1, wherein plural silicone elastomers are laminated via adhesion layers comprising the silicone elastomer as recited in claim 1.

5. A process for producing the silicone elastomer laminate according to claim 1, comprising the steps of:
forming an adhesion layer by applying the silicone elastomer composition as recited in claim 1 to a surface of a silicone elastomer substrate, and curing; and
laminating a silicone elastomer by applying another silicone elastomer composition to a surface of the adhesion layer, and curing.

6. The silicone elastomer laminate according to claim 1 obtained by a process comprising the steps of:
forming the adhesion layer by applying the silicone elastomer composition to a surface of the silicone elastomer substrate, and curing; and
laminating the silicone elastomer by applying the silicone elastomer composition to a surface of the adhesion layer, and curing.

7. A process for producing the silicone elastomer laminate according to claim 1, comprising the steps of:
forming an adhesion layer by curing the silicone elastomer composition as recited in claim 1; and
producing a silicone elastomer laminate by applying another silicone elastomer composition to at least one surface of the adhesion layer, and curing.

8. The silicone elastomer laminate according to claim 1 obtained by a process comprising the steps of:
forming the adhesion layer by curing the silicone elastomer composition as recited in claim 1; and
producing the silicone elastomer laminate by applying the silicone elastomer composition to at least one surface of the adhesion layer, and curing.

9. A process for producing the silicone elastomer laminate according to claim 1, comprising the steps of:
forming adhesion layer(s) by curing the silicone elastomer composition as recited in claim 1 among plural silicone elastomers.

10. The silicone elastomer laminate according to claim 1 obtained by a process comprising the step of:
forming adhesion layer(s) by curing the silicone elastomer composition as recited in claim 1 among plural silicone elastomers.

11. The silicone elastomer laminate according to claim 2, wherein the silicone elastomer composition further comprises (F) silica fine powder.

* * * * *